United States Patent
Tzruya (10) Patent No.: US 7,844,442 B2
(45) Date of Patent: Nov. 30, 2010

(54) SYSTEM AND METHOD FOR PROVIDING A REMOTE USER INTERFACE FOR AN APPLICATION EXECUTING ON A COMPUTING DEVICE

(75) Inventor: Yoav M. Tzruya, Even Yehuda (IL)

(73) Assignee: Exent Technologies, Ltd., Petach-Tikva (IL)

( * ) Notice: Subject to any disclaimer, the term of this patent is extended or adjusted under 35 U.S.C. 154(b) by 1046 days.

(21) Appl. No.: 11/204,363

(22) Filed: Aug. 16, 2005

(65) Prior Publication Data

US 2007/0043550 A1    Feb. 22, 2007

(51) Int. Cl.
*G06F 9/45*    (2006.01)
*G06F 15/16*    (2006.01)

(52) U.S. Cl. .................................. 703/22; 709/227
(58) Field of Classification Search .................. 703/22; 709/227
See application file for complete search history.

(56) References Cited

U.S. PATENT DOCUMENTS

| | | | |
|---|---|---|---|
| 4,356,545 A | 10/1982 | West | |
| 5,440,699 A | 8/1995 | Farrand et al. | |
| 5,546,538 A | 8/1996 | Cobbley et al. | |
| 5,627,977 A | 5/1997 | Hickey et al. | |
| 6,052,120 A | 4/2000 | Nahi et al. | |
| 6,084,584 A | 7/2000 | Nahi et al. | |
| 6,166,734 A | 12/2000 | Nahi et al. | |
| 6,219,695 B1 | 4/2001 | Guttag et al. | |
| 6,243,772 B1 * | 6/2001 | Ghori et al. | 710/68 |
| 6,732,067 B1 | 5/2004 | Powderly | |
| 6,874,009 B1 | 3/2005 | Tuli | |
| 6,897,833 B1 | 5/2005 | Robinson et al. | |
| 6,904,519 B2 | 6/2005 | Anand et al. | |
| 6,915,327 B1 | 7/2005 | Tuli | |
| 6,924,790 B1 | 8/2005 | Bi | |
| 6,928,461 B2 | 8/2005 | Tuli | |
| 7,274,368 B1 * | 9/2007 | Keslin | 345/522 |
| 2001/0009424 A1 * | 7/2001 | Sekiguchi | 345/740 |
| 2002/0045484 A1 * | 4/2002 | Eck et al. | 463/42 |
| 2002/0107072 A1 * | 8/2002 | Giobbi | 463/42 |
| 2003/0101294 A1 * | 5/2003 | Saint-Hilaire et al. | 710/11 |

(Continued)

FOREIGN PATENT DOCUMENTS

EP    0 370 274    5/1990

(Continued)

OTHER PUBLICATIONS

Ohazama's OpenGL Vizserver, Dec. 15, 1999, SGI, 8 pages.*

(Continued)

*Primary Examiner*—David Silver
(74) *Attorney, Agent, or Firm*—Fiala & Weaver, P.L.L.C.

(57) ABSTRACT

A system that includes a computing device configured to execute a software application and at least one remote user interface (UI) communicatively coupled to the computing device via a data communication network. The remote UI includes at least one hardware device such as a video, audio or user input/output (I/O) device. The computing device is further configured to emulate the hardware device locally and to redirect function calls generated by the software application for the emulated local hardware device to the remote UI for processing by the hardware device.

40 Claims, 4 Drawing Sheets

U.S. PATENT DOCUMENTS

| | | | |
|---|---|---|---|
| 2003/0218632 A1 | 11/2003 | Altwies et al. | |
| 2003/0232648 A1* | 12/2003 | Prindle | 463/40 |
| 2003/0234809 A1 | 12/2003 | Parker et al. | |
| 2004/0172486 A1* | 9/2004 | Ghori et al. | 710/1 |
| 2004/0189677 A1* | 9/2004 | Amann et al. | 345/660 |
| 2005/0091607 A1 | 4/2005 | Satou et al. | |
| 2006/0282514 A1* | 12/2006 | Saint-Hilaire et al. | 709/218 |

FOREIGN PATENT DOCUMENTS

| | | |
|---|---|---|
| EP | 0 778 523 | 6/1997 |
| EP | 0 889 402 | 1/1999 |
| WO | 02/101518 A2 | 12/2002 |

OTHER PUBLICATIONS

ThomasNet News, "Wireless Monitor provides plug-and-play functionality", May 18, 2004, ThomasNet, 8 pages, http://news.thomasnet.com/fullstory/451769.*

Buck, Ian et al., "Tracking Graphics State for Networked Rendering", Proceedings of the 2000 Eurographics/SIGGRAPH Workshop on Graphics Hardware, (2000), 9 pages.

Humphreys, Greg et al., "Chromium: A Stream-Processing Framework for Interactive Rendering on Clusters", Proceedings of the International Conference on Computer Graphics and Interactive Techniques, Submitted to SIGGRAPH 2002, (2002), 10 pages.

Ignasiak, Krystian et al., "Synthetic-Natural Camera for Distributed Immersive Environments", 6th Int. Workshop on Image Analysis for Multimedia Interactive Services (WIAMIS'2005), Montreux, Switzerland, Apr. 13-15, 2005, 4 pages.

Stegmaier, Simon et al., "A Generic Solution for Hardware-Accelerated Remote Visualization", Joint Eurographics—IEEE TCVG Symposium on Visualization 2002, 9 pages.

"Hooking Function Calls to Hardware to Monitor Computer Output on Other Computers", IBM Technical Disclosure Bulletin, IBM Corp., New York, US, vol. 37, No. 1, Jan. 1994, pp. 51-61.

Anonymous, "Remote Desktop Protocol (RDP) Features and Performance", Internet Article, [Online] Apr. 21, 2001, retrieved from the Internet: URL:http://web.archive.org/web/20010421050005/http://www.thinclient.net/technology/RDP_Features_and_Performance.htm> [retrieved on Feb. 26, 2007], 11 pages.

Internet Archive, "Internet Archive Wayback Machine", Internet Article, [Online] Feb. 26, 2007, retrieved from the Internet: URL:http://web.archive.org/web/*/http://www.thinclient.net/technology/RDP_Features_and_Performance.htm> [retrieved on Feb. 26, 2007], 1 page.

Shaikh et al., "Implementation of a service platform for online gaming", *SIGCOM '04 Workshops*, Aug. 30 and Sep. 3, 2004, Portland, Oregon, pp. 106-110.

Moulton et al., "Remote programmability of graphic interactions in a host/satellite configuration", Digital Equipment Corporation, Maynard, MA, pp. 204-211.

Lantz et al., "Factors affecting the performance of distributed applications", 1984, pp. 116-123, ACM.

* cited by examiner

SYSTEM AND METHOD FOR PROVIDING A REMOTE USER INTERFACE FOR AN APPLICATION EXECUTING ON A COMPUTING DEVICE

BACKGROUND OF THE INVENTION

1. Field of the Invention

The present invention generally relates to user interfaces for an application executing on a computing device. In particular, the present invention relates to a system and method for providing a remote user interface for an application, such as a video game, executing on a computing device.

2. Background

Currently, the platforms available for playing video games or other real-time software applications in the home include personal computers (PC) and various proprietary console-based systems, such as the XBOX (manufactured and sold by Microsoft Corporation of Redmond Wash.) and the PLAYSTATION (manufactured and sold by Sony Computer Entertainment, Inc. of Tokyo Japan). These platforms are limited in various respects. For example, a given PC can run only a single video game at a time, since the video game requires exclusive control over both the graphics and audio hardware of the PC as well as the PC's display and sound system. This is true regardless of whether the game is being played on-line (i.e., in connection with a server or other PC over a data communication network) or off-line. To enable multiple end users to play different video games at the same time, an entirely new PC or other gaming platform must be purchased and located elsewhere in the home. Furthermore, the end user is confined to playing the video game in the room in which the PC is located.

BRIEF SUMMARY OF THE INVENTION

The present invention provides a system and method for providing a remote user interface for an application, such as a video game, executing on a computing device. The system includes a computing device, such as a personal computer (PC), configured to execute a software application and a remote user interface (UI) communicatively coupled thereto via a data communication network. The remote UI includes a hardware device such as a video, audio or user input/output (I/O) device. The computing device is also configured to emulate a local hardware device and to redirect function calls generated by the software application for the emulated local hardware device to the remote UI for processing therein. The computing device may also be further configured to receive control commands from the remote UI, the control commands originating from a user I/O device, and to redirect the control commands to the software application.

In accordance with an implementation of the present invention, multiple remote UIs may be coupled to the computing device via the data communication network, and each of the multiple remote UIs may include one or more hardware devices, such as one or more of a video, audio or user I/O device.

By off-loading the processing of graphics and/or audio commands to a remote UI, an implementation of the present invention permits simultaneously execution of multiple software applications on the computing device. Consequently, a user of a first remote UI can remotely access and interact with a first software application executing on computing device while a user of a second remote UI remotely accesses and utilizes a second software application executing on the computing device. In this way, more than one user within a home can remotely use different interactive software applications executing on the computing device at the same time that would have otherwise exclusively occupied the resources of the computing device.

An implementation of the present invention provides a low-cost solution to the problem of providing multiple remote user interfaces for using interactive software applications throughout the home.

An implementation of the present invention provides additional benefits in that it allows a software application to be executed on its native computing platform while being accessed via a remote UI, without requiring that the software application be programmed to accommodate such remote access. This is achieved through the emulation of local resources by the computing device and the subsequent interception and redirection of commands generated by the software application for those local resources in a manner transparent to the software application. This is in contrast to, for example, conventional X-Windows systems that enable programs running on one computer to be displayed on another computer. In order to make use of X-Windows technology, only software applications written specifically to work with the X-Windows protocol can be used.

Furthermore, because a remote UI in accordance with an implementation of the present invention need only implement the low-level hardware necessary to process graphics and audio commands transmitted from the computing device, it may be manufactured in a low-cost fashion relative to the cost of manufacturing the computing device.

Indeed, because the remote UI device need only implement such low-level hardware, the remote UI device can be implemented as a mobile device, such as a personal digital assistant (PDA), thereby allowing an end user to roam from place to place within the home, or as an extension to a set-top box, thereby integrating into cable TV and IPTV networks.

Additionally, because an implementation of the present invention sends graphics and audio commands from the computing device to a remote UI device rather than a high-bandwidth raw video and audio feed, such an implementation provides a low-latency, low-bandwidth alternative to the streaming of raw video and audio content over a data communication network. Thus, an implementation of the present invention marks an improvement over conventional "screen-scraping" technologies, such as those implemented in Windows terminal servers, in which graphics output is captured at a low level, converted to a raw video feed and transmitted to a remote device in a fully-textured and fully-rendered form.

Further features and advantages of the present invention, as well as the structure and operation of various embodiments thereof, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

FIG. 4 depicts an example computer system that may be utilized to implement a computing device in accordance with an implementation of the present invention The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

A. System Architecture

Figure 1:
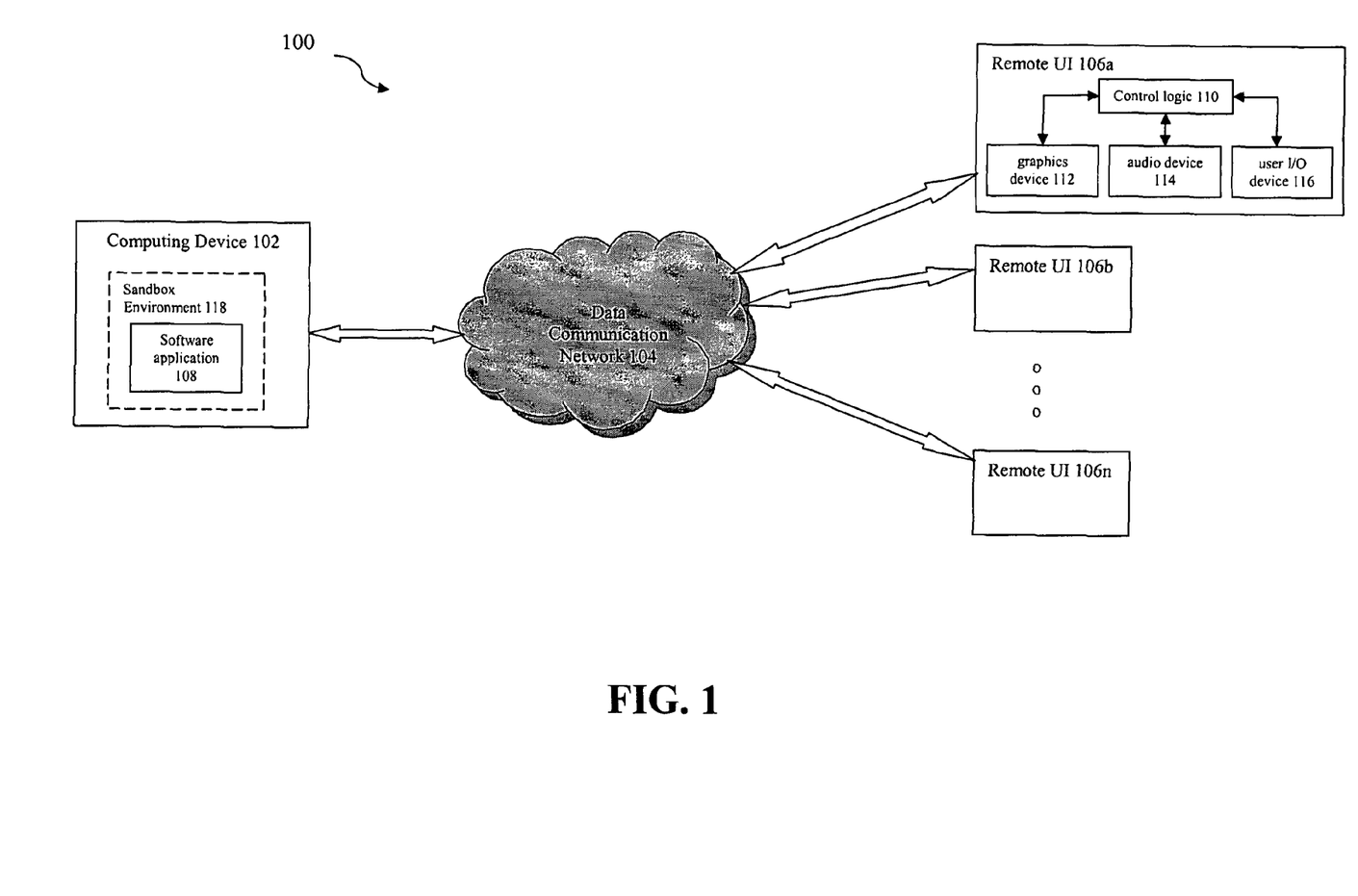
FIG. 1 is a block diagram illustrating an exemplary system for providing a remote user interface for an application executing on a computing device in accordance with an implementation of the present invention.

FIG. 1 is a high level block diagram illustrating an exemplary system 100 for providing a remote user interface for an application executing on a computing device. As shown in FIG. 1, system 100 includes a computing device 102 coupled to one or more remote user interfaces (UIs) 106a-106n via a data communication network 104. In one exemplary implementation, computing device 102 and remote UIs 106a-106n are all located in a user's home and data communication network 104 comprises a wired and/or wireless local area network (LAN). In an alternative exemplary implementation, computing device 102 is located at the central office or point-of-presence of a broadband service provider, remote U's 106a-106n are located in a user's home, and data communication network 104 includes a wide area network (WAN) such as the Internet.

Computing device 102 is configured to execute a software application 108, such as a video game, that is programmed to generate graphics and audio commands for respective hardware devices capable of executing those commands. Software application 108 is also programmed to receive and respond to control commands received from a user input/output (I/O) device and/or associated user I/O device interface. Computing device 102 represents the native platform upon which software application 108 was intended to be executed and displayed.

For the sake of convenience, from this point forward, computing device 102 will be described as a personal computer (PC) and software application 108 will be described as a software application programmed for execution on a PC. However, the present invention is not so limited. For example, computing device 102 may comprise a server, a console, or any other processor-based system capable of executing software applications.

In a conventional PC, graphics and audio commands generated by a software application such as software application 108 would be received by software interfaces also executing on the PC and then processed for execution by local hardware devices, such as a video and audio card connected to the motherboard of the PC. Furthermore, control commands for the software application would be received via one or more local user input/output (I/O) devices coupled to an I/O bus of the PC, such as a keyboard, mouse, game controller or the like, and processed by a locally-executing software interface prior to receipt by the software application.

In contrast, in accordance with FIG. 1 and as will be described in more detail herein, software application 108 is executed within a sandbox environment 118 on computing device 102. Sandbox environment 118 captures the graphics and audio commands generated by software application 108 and selectively redirects them to one of remote UIs 106a-106n via data communication network 104. This allows software application 108 to be displayed on the remote UI using the hardware of the remote UI, even though software application 108 may not have been programmed to utilize such remote resources. Furthermore, sandbox environment 118 receives control commands from the remote UI via data communication network 104 and processes them for input to software application 108.

As shown in FIG. 1, remote UI 106a includes control logic 110, a graphics device 112, an audio device 114, and a user I/O device 116. Each of the other remote U's 106b-106n includes similar features, although this is not shown in FIG. 1 for the sake of brevity. Control logic 110 comprises an interface between data communication network 104 and each of graphics device 112, audio device 114 and user I/O device 116. As will be described in more detail herein, control logic 110 is configured to at least perform functions relating to the publication of graphics, audio and user I/O device capability information over data communication network 104 and to facilitate the transfer of graphics, audio and user I/O device commands from computing device 102 to graphics device 112, audio device 114, and user I/O device 116. As will be appreciated by persons skilled in the relevant art based on the teachings provided herein, control logic 110 can be implemented in hardware, software, or as a combination of hardware and software.

Graphics device 112 comprises a graphics card or like hardware capable of executing graphics commands to generate image and video content. Audio device 114 comprises an audio card or like hardware capable of executing audio commands to generate audio content. User I/O device 116 comprises a mouse, keyboard, game controller or like hardware capable of receiving user input and generating control commands therefrom. User I/O device 116 may be connected to remote UI 106a using a direct cable connection or any type of wireless communication.

Each of remote UIs 106a-106n can be a device capable of independently displaying the video content, playing the audio content and receiving control commands from a user. Each of remote UIs 106a-106n may operate in conjunction with one or more other devices to perform these functions. For example, the remote UI may comprise a set-top box that operates in conjunction with a television to which it is connected to display video content, play audio content, and in conjunction with a user I/O device to which it is connected to receive control commands from a user. As a further example, the remote UI may comprise a PC that operates in conjunction with a monitor to which it is connected to display video content, with a sound system or speakers to which it is connected to play audio content, and in conjunction with a user I/O device to which it is connected to receive control commands from a user.

Although FIG. 1 shows only one software application 108 executing within sandbox environment 118, it is to be appreciated that multiple software applications may be simultaneously executing within multiple corresponding sandbox environments 118. Consequently, a user of a first remote UI can remotely access and interact with a first software application executing on computing device 102 while a user of a second remote UI remotely accesses and utilizes a second software application executing on computing device 102, each in accordance with the techniques described herein. In this way, more than one user within a home can use different interactive software applications executing on computing device 102 at the same time.

The operation and interaction of sandbox environment 118 and remote UIs 106a-106n will now be described in more detail.

1. Sandbox Environment

Sandbox environment 118 comprises one or more software modules installed on computing device 102 that operate to isolate software application 108 from other processes executing on computing device 102 and that optionally prevent a user from accessing processes or files associated with software application 108. At a minimum, sandbox environment 118 includes one or more software modules that capture graphics and audio commands generated by software application 108 for selective transmission to one of remote UIs 106a-106n. The capturing of commands may occur, for example, at the device driver level or hardware abstraction layer (HAL) level of computing device 102.

In particular, sandbox environment 118 is configured to receive notifications from the control logic within each of remote UIs 106a-106n. The term "notification" is used in a general sense, and may in fact include the transmission of multiple messages from a remote UI to computing device 102 or the exchange of messages between a remote UI and computing device 102. The notifications provide a means by which each of remote U's 106a-106n can publish its capabilities. In one implementation, a device discovery and control protocol such as UPnP is used to allow sandbox environment 118 to automatically discover each of remote UIs 106a-106n and to learn about their capabilities.

Upon learning about the capabilities of a remote UI, sandbox environment 118 emulates the existence of a device, including device drivers, having similar capabilities. For example, upon receiving information about the capabilities of remote UI 106a, sandbox environment 118 would emulate devices having the respective capabilities of graphics device 112, audio device 114, and user I/O device 116. This would include creating a software stack for each of those devices on computing device 102.

The published capabilities of a remote UI may be inherently different than the internal hardware and software capabilities of computing device 102. As such, the software stacks created on computing device 102 provide an emulated environment which allow software application 108 to operate as if such capabilities existed within computing device 102.

Furthermore, the published capabilities of a remote UI 106a may be significantly different than the capabilities of remote U's 106b-106n. To address this, an implementation of the present invention creates a separate software stack for each such remote UI within a corresponding separate sandbox environment 118 on computing device 102. Each software stack may be significantly different from each other software stack. As a result, a heterogeneous set of remote U's can be supported by system 100.

Once created, an emulated device captures commands generated by software application 108 relating to graphics, audio, or user I/O devices, depending on the type of device being emulated. The captured commands are transmitted over data communication network 104 to a selected one of remote UIs 106a-106n. For example, commands generated by software application 108 directed to a DirectX or OpenGL stack may be captured and transmitted over data communication network 104 to one of remote U's 106a-106n.

As will be appreciated by persons skilled in the art, because sandbox environment 118 captures graphics and audio commands in their "meta" form and transmits them from computing device 102 to a remote UI 106a-106n, an implementation of the present invention provides a low-latency, low-bandwidth alternative to the streaming of raw video and audio content over a data communication network. An example of such meta commands includes, but is not limited to, OpenGL commands, DirectX commands or Graphics Device Interface (GDI) commands.

In one implementation, sandbox environment 118 generates one or more Pre-Rendering Code (PRC) streams or commands responsive to the receipt of DirectX or OpenGL inputs from software application 108. These PRC streams are then transmitted over data communication network 104 to a selected one of remote UIs 106a-106n, where they are received and processed by an output device to generate video and/or audio content. The manner in which the PRC is generated may be related to parameters of the output device which were made known when the remote UI first published its capabilities.

2. Remote UIs

Each of remote UIs 106a-106n includes hardware and software stacks for processing graphics commands and generating graphics content therefrom, processing audio commands and generating audio content therefrom, and for receiving user input and generating control commands therefrom. As noted above, each remote UI 106a-106n publishes its particular set of capabilities to sandbox environment 118. This may be achieved, for example, by sending a notification to computing device 102 via data communication network 104 or alternatively through the use of a device discovery and control protocol such as UPnP.

The software stacks on each remote UI are capable of processing graphics and audio commands transmitted over data communication network 104 by computing device 102. The processing is performed in adherence with both the original command functionality as well as in a low-latency fashion. In an implementation where the commands comprise PRC streams (described above), the software stacks convert the PRC into video and audio output to feed a presentation device (e.g., video display, speakers) that is integrated with or connected to the remote UI device.

B. Example Process

Figure 2:
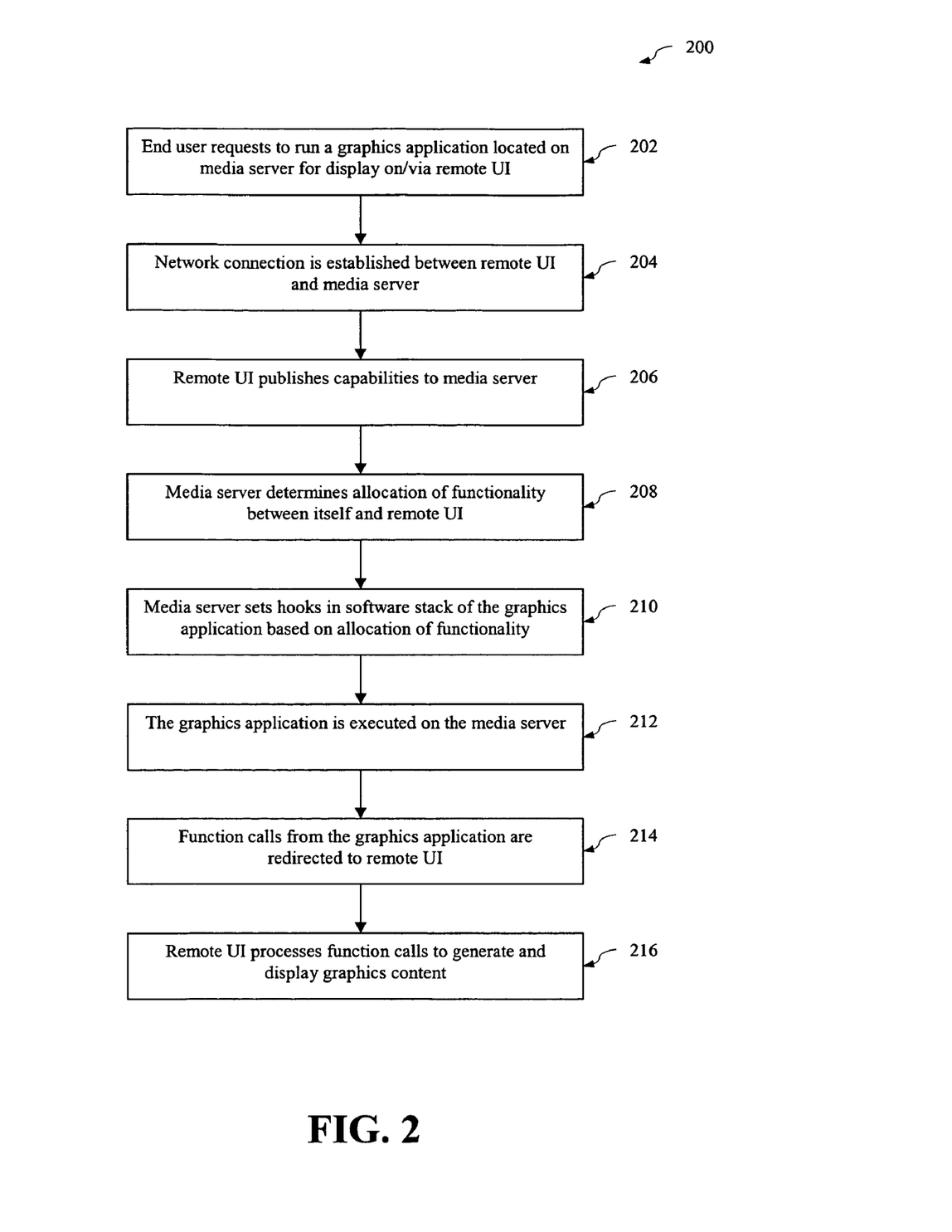
FIG. 2 is a flowchart of an example process for establishing communication between a computing device and a remote UI and for remotely generating and displaying graphics content via the remote UI in accordance with an implementation of the present invention.

FIG. 2 is a flowchart 200 of an example process for establishing communication between computing device 102 and one of remote UIs 106a-106n and for remotely generating and displaying graphics content via the remote UI. In the following description, the combination of computing device 102 and sandbox environment 118 executing thereon will be collectively referred to as "the media server", while the remote UI 106a-106n with which it is communicating will simply be referred to as "the remote UI".

As shown in FIG. 2, the process begins at step 202, in which an end user requests to run or start a graphics application that is located on the media server for display on the remote UI, or on a device that is connected to the remote UI. For example, the end user may request to run a video game located on the media server, wherein the media server is situated in the basement of the end user's home, in order to view it on a television which is connected to the remote UI in another part of the end user's home. The request may be input by the end user via a user interface located on the remote UI or on a device connected to the remote UI.

At step 204, responsive to the end user's request, a network connection is established between the remote UI and the media server via a data communication network. As will be readily appreciated by persons skilled in the art, any of a variety of network protocols can be used in order to set up communication between the remote UI and the media server. For example, in one implementation, the media server is configured to listen and wait for an incoming Internet Protocol (IP) connection and the media server is configured to establish a Transmission Control Protocol/Internet Protocol (TCP/IP) connection to the remote UI when needed.

At step 206, after a connection has been established between the remote UI and the media server, the remote UI publishes or exposes its capabilities to the media server. These capabilities can be published via unidirectional or bidirectional communication between the remote UI and the media server. In one implementation, the establishment of a network connection between the media server and the remote UI as set forth in step 204 and the publication of the capabilities of the remote UI as set forth in step 206 each may be facilitated by the use and extensions of a network discovery and control protocol such as UPnP.

At step 208, based on the published capabilities of the remote UI, the media server determines what functionality required for executing the requested graphic application can be executed on the media server and what functionality can be executed on the remote UI. The decision algorithm executed by the media server to make this determination may be based on the capabilities of both the remote UI and the media server as well as on the hardware and software resources currently available on each at the time the algorithm is executed. In one implementation, the media server is configured to dynamically adjust its allocation of functionality during the execution of the requested graphic application if the capabilities and available resources change.

At step 210, after the capabilities of the remote UI have been exposed and the decision algorithm executed by the media server defines what portions of the graphic rendering are to be executed on each of the media server and the remote UI, software hooks are set in the relevant software and operating system (OS) stack on the media server in order to capture the relevant functionality in real time. For example, the hooks can be set on interfaces such as DirectX or OpenGL interfaces, or on any other interface. The software hooks capture graphics commands and redirect them to the remote UI.

Figure 3:
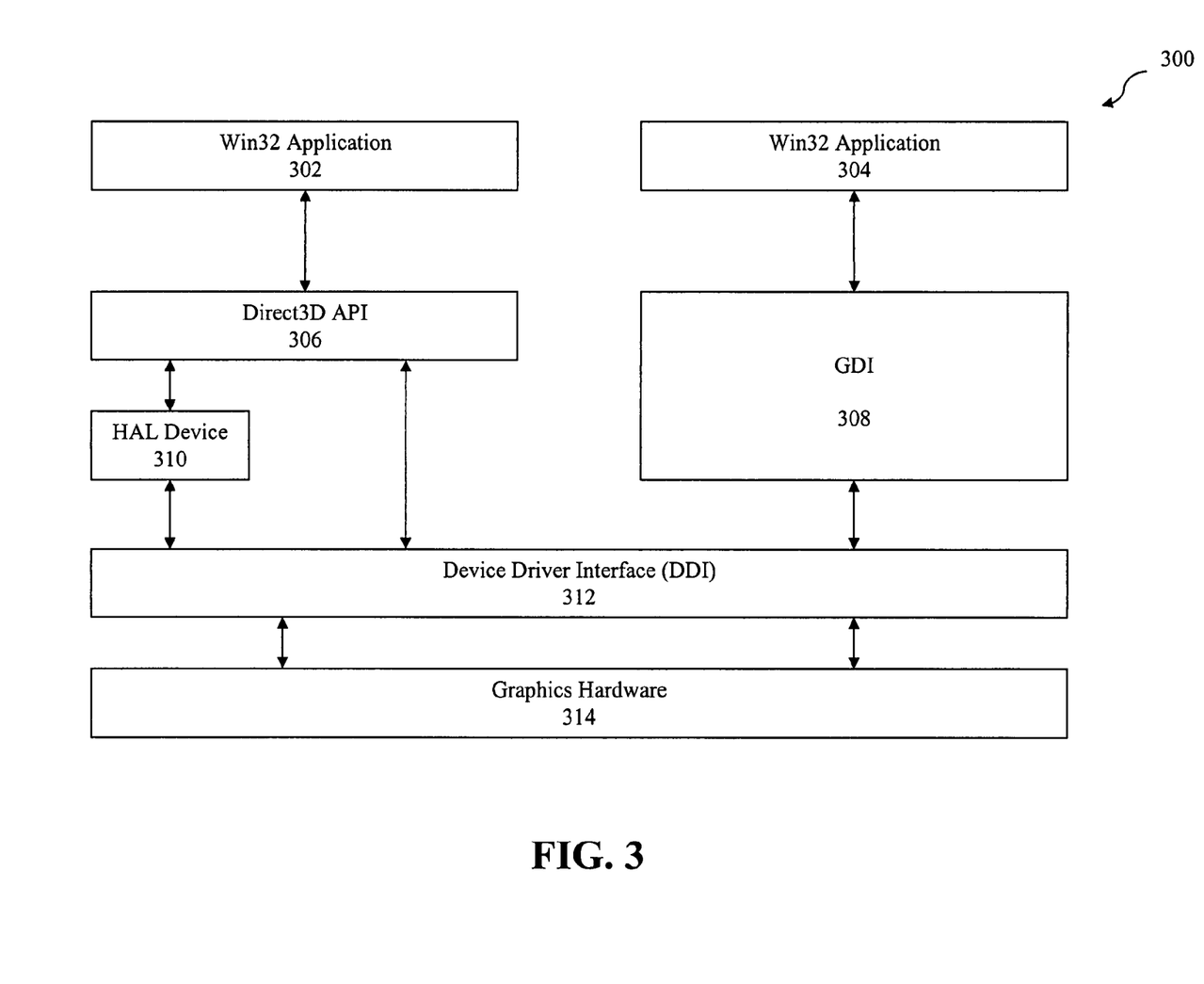
FIG. 3 illustrates an example software architecture of a media server in accordance with an implementation of the present invention.

FIG. 3 illustrates an example software architecture 300 of the media server that is useful in understanding step 210. As shown in FIG. 3, software architecture 300 comprises two graphics applications 302 and 304, which are identified as 32-bit applications configured for execution on the MICROSOFT WINDOWS operating system (published by Microsoft Corporation of Redmond, Wash.), executing on the media server. Each application 302 and 304 has a different software stack by which it utilizes graphics hardware 314.

In particular, graphics commands generated by application 302 are received by a Direct3D application programming interface (API) 306. Direct3D API 306 processes the graphics commands for input to a device driver interface (DDI) 312 either directly or via a hardware abstraction layer (HAL) device 310. DDI 312 then processes the input and generates commands for graphics hardware 314. In contrast, graphics commands generated by application 304 are received by a Microsoft® Windows® Graphics Device Interface (GDI) 308. GDI 308 processes the graphics commands for input to DDI 312, which then processes the input and generates commands for graphics hardware 314.

In accordance with step 210, the media server can set software hooks in between any of the depicted layers of the software stacks for applications 302 and 304, wherein the location of a hook is determined based on the allocation of functionality between the remote UI and the media server. Thus, for example, with respect to application 302, a software hook could be set between application 302 and Direct3D API 306 if the remote UI fully supports Direct3D. Alternatively, a software hook could be set between Direct3D API 306 and HAL device 310, or between Direct3D API 306 and DDI 312 if the remote UI is less powerful and it is determined that some Direct3D processing must be performed on the media server. With respect to application 304, a software hook could be set between application 304 and GDI 308 or between GDI 308 and DDI 312 depending on the allocation of functionality between the media server and the remote UI.

The location of the software hooks is tied to which software layers must be emulated on the media server. In particular, the media server emulates those layer just below the software hooks, thereby providing the upper layers the necessary interfaces to "believe" that the lower levels are fully available on the media server. However, instead of fully implementing the lower levels, the emulated layer transmits relevant commands to the remote UI to ensure proper operation of graphics applications 302 and 304.

Returning now to flowchart 200, once the software hooks have been set at step 210, the graphics application is executed on the media server as shown at step 212. During execution of the graphics application, when a function that should be executed on the remote UI is called, the function call or command is redirected by the software hooks to the remote UI as shown at step 214. In an implementation, the function call is redirected using a Remote Procedure Call (RPC)-like communication protocol. It should be noted that, depending on the allocation of functionality between the media server and the remote UI, some function calls may be handled entirely by the media server. In any case, at step 216, the remote UI processes the function calls received from the media server to generate and display graphics content.

Note that in an alternate implementation, one or more of steps 204, 206, and 208 (involving the publication of the capabilities of the remote UI, the allocation of functionality between the media server and the remote UI, and the setting of software hooks) may be performed prior to receipt of the end user's request to run a graphics application. For example, one or more of these steps could be performed the first time the media server and the remote UI are both connected to the data communication network.

With minor modifications, the foregoing method of flowchart 200 is also applicable to the remote generation and playing of the audio content portion of a software application via the remote UI. In an audio context, the media server compares the audio capabilities of the remote UI and the media server and then allocates functionality to each based on a decision algorithm. Software hooks are set in accordance with this allocation. The software hooks redirect audio-related function calls to the remote UI, where they are processed to generate audio content. Depending on the implementation, the audio content is then either played by the remote UI itself, or by a device connected to the remote UI.

Furthermore, the same general approach can be used to handle the remote generation and processing of control commands by a user I/O device attached to the remote UI. Again, the media server compares the user I/O device capabilities of the remote UI and the media server and allocates functionality to each based on a decision algorithm. Device drivers that emulate the I/O capabilities of the remote UI are created on the media server in accordance with this allocation. Control commands associated with a user I/O device are unique in that they may be transmitted in both directions—from the remote UI to the media server and from the media server to the remote UI (e.g., as in the case of a force feedback game controller). Thus, the software hooks in this case operate both to receive control commands transmitted from the remote UI and to re-direct function calls related to the user I/O device to the remote UI. Once again, an RPC-like protocol can be used for communication between the two.

C. Example Computing Device

Figure 4:
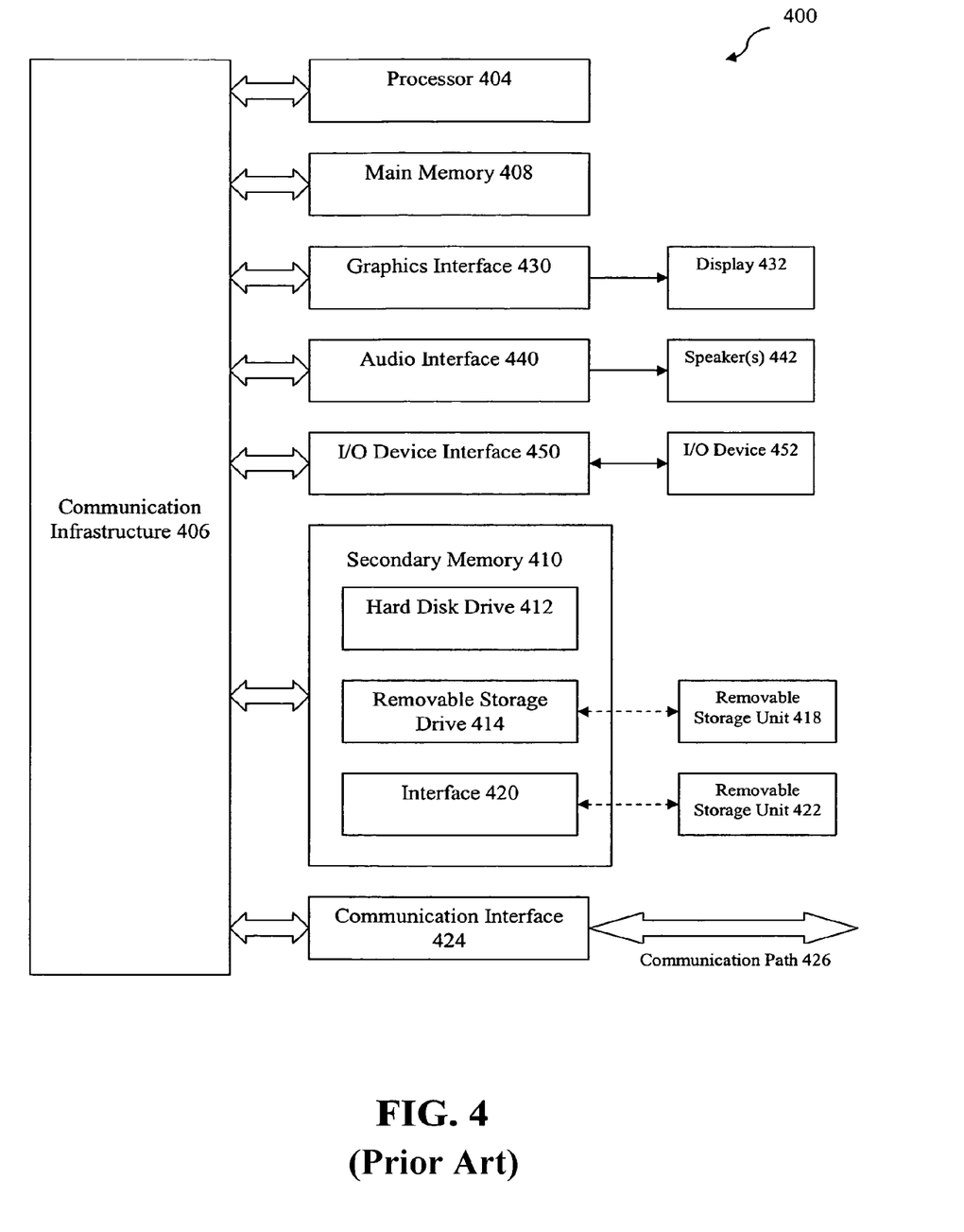

FIG. 4 depicts an example computer system 400 that may be utilized to implement computing device 102. However, the following description of computer system 400 is provided by way of example only and is not intended to be limiting. Rather, as noted elsewhere herein, computing device 102 may alternately comprise a server, a console, or any other processor-based system capable of executing software applications.

As shown in FIG. 4, example computer system 400 includes a processor 404 for executing software routines. Although a single processor is shown for the sake of clarity, computer system 400 may also comprise a multi-processor system. Processor 404 is connected to a communication infrastructure 406 for communication with other components of computer system 400. Communication infrastructure 406 may comprise, for example, a communications bus, crossbar, or network.

Computer system 400 further includes a main memory 408, such as a random access memory (RAM), and a secondary memory 410. Secondary memory 410 may include, for example, a hard disk drive 412 and/or a removable storage drive 414, which may comprise a floppy disk drive, a magnetic tape drive, an optical disk drive, or the like. Removable storage drive 414 reads from and/or writes to a removable storage unit 418 in a well known manner. Removable storage unit 418 may comprise a floppy disk, magnetic tape, optical disk, or the like, which is read by and written to by removable storage drive 414. As will be appreciated by persons skilled in the relevant art(s), removable storage unit 418 includes a computer usable storage medium having stored therein computer software and/or data.

In an alternative implementation, secondary memory 410 may include other similar means for allowing computer programs or other instructions to be loaded into computer system 400. Such means can include, for example, a removable storage unit 422 and an interface 420. Examples of a removable storage unit 422 and interface 420 include a program cartridge and cartridge interface (such as that found in video game console devices), a removable memory chip (such as an EPROM or PROM) and associated socket, and other removable storage units 422 and interfaces 420 which allow software and data to be transferred from the removable storage unit 422 to computer system 400.

Computer system 400 also includes at least one communication interface 424. Communication interface 424 allows software and data to be transferred between computer system 400 and external devices via a communication path 426. In particular, communication interface 424 permits data to be transferred between computer system 400 and a data communication network, such as a public data or private data communication network. Examples of communication interface 424 can include a modem, a network interface (such as Ethernet card), a communication port, and the like. Software and data transferred via communication interface 424 are in the form of signals which can be electronic, electromagnetic, optical or other signals capable of being received by communication interface 424. These signals are provided to the communication interface via communication path 426.

As shown in FIG. 4, computer system 400 further includes a graphics interface 430, an audio interface 440, and an I/O device interface 450. In a conventional mode of operation, a software application executed by processor 404 generates graphics and audio commands. The graphics commands are received by graphics interface 430, which processes them to generate video content for display on a local display 432. The audio commands are received by audio interface 440, which processes them to generate audio content for playback by one or more local speaker(s) 442. I/O device interface 450 receives control commands from a local I/O device 452, such as a keyboard, mouse, game controller or the like, and processes them for handling by the software application being executed by processor 404.

However, as described in more detail elsewhere herein, in accordance with an implementation of the present invention, a software application is executed by processor 404 within a sandbox environment. The sandbox environment captures graphics and audio commands generated by the software application and selectively redirects them to a remote UI (not shown) via communications interface 424. The graphics commands are processed by a graphics interface within the remote UI to generate video content for display on a remote display. The audio commands are processed by an audio interface within the remote UI to generate audio content for playback by one or more remote speaker(s). Additionally, the sandbox environment receives control commands from the remote UI via communications interface 424 and processes them for input to the software application. Thus, in this implementation, the hardware associated with local graphics interface 430, audio interface 440, and I/O device interface 450 is not used to execute the software application. Rather, hardware within (or connected) to the remote UI is used to carry out analogous functions.

As used herein, the term "computer program product" may refer, in part, to removable storage unit 418, removable storage unit 422, a hard disk installed in hard disk drive 412, or a carrier wave carrying software over communication path 426 (wireless link or cable) to communication interface 424. A computer useable medium can include magnetic media, optical media, or other recordable media, or media that transmits a carrier wave or other signal. These computer program products are means for providing software to computer system 400.

Computer programs (also called computer control logic) are stored in main memory 408 and/or secondary memory 410. Computer programs can also be received via communication interface 424. Such computer programs, when executed, enable the computer system 400 to perform one or more features of the present invention as discussed herein. In particular, the computer programs, when executed, enable the processor 404 to perform features of the present invention. Accordingly, such computer programs represent controllers of the computer system 400.

Software for implementing the present invention may be stored in a computer program product and loaded into computer system 400 using removable storage drive 414, hard disk drive 412, or interface 420. Alternatively, the computer program product may be downloaded to computer system 400 over communications path 426. The software, when executed by the processor 404, causes the processor 404 to perform functions of the invention as described herein.

D. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method for providing a remote user interface for a computing device, comprising:
    receiving capability information at the computing device from a remote user interface (UI) that is connected to the computing device via a network connection, wherein the capability information describes at least software capabilities of the remote UI;
    emulating the capabilities described by the received capability information by creating a software stack on the computing device;
    executing a software application within a sandbox environment on the computing device; and
    capturing by the sandbox environment commands generated by the software application for the software stack or generated by the software stack responsive to the execution of the software application and redirecting the captured commands to the remote UI;
    receiving updated capability information from the remote UI; and
    dynamically modifying the software stack based on the updated capability information.

2. The method of claim 1, wherein emulating the capabilities described by the received capability information comprises emulating a graphics device and wherein redirecting the captured commands comprises redirecting graphics commands.

3. The method of claim 1, wherein emulating the capabilities described by the received capability information comprises emulating an audio device and wherein redirecting the captured commands comprises redirecting audio commands.

4. The method of claim 1, wherein emulating the capabilities described by the received capability information comprises emulating a user input/output (I/O) device and wherein redirecting the captured commands comprises redirecting control commands.

5. The method of claim 4, further comprising:
    receiving control commands from the remote UI; and
    providing the received control commands to the software application or to the software stack.

6. The method of claim 1, wherein capturing the commands generated by the software application for the software stack or generated by the software stack responsive to execution of the software application comprises:
    intercepting the commands by a software hook installed in the software stack.

7. The method of claim 6, further comprising:
    installing the software hook between selected layers of the software stack wherein the layers are selected based on the received capability information.

8. The method of claim 7, wherein dynamically modifying the software stack based on the updated capability information comprises:
    dynamically installing a new software hook between selected layers of the software stack wherein the layers are selected based on the updated capability information.

9. The method of claim 1, further comprising:
    receiving second capability information from a second remote UI at the computing device;
    emulating capabilities described by the received second capability information by creating a second software stack on the computing device;
    executing a second software application on the computing device; and
    redirecting commands generated by the second software application for the second software stack or generated by the second software stack responsive to execution of the second software application to the second remote UI.

10. A computing device, comprising:
    means for receiving capability information from a remote user interface (UI) that is connected to the computing device via a network connection, wherein the capability information describes at least software capabilities of the remote UI;
    means for emulating the capabilities described by the received capability information by creating a software stack on the computing device;
    means for executing a software application within a sandbox environment; and
    means for capturing by the sandbox environment commands generated by the software application for the software stack or generated by the software stack responsive to execution of the software application and redirecting the captured commands to the remote UI;
    means for receiving updated capability information from the remote UI; and
    means for dynamically modifying the software stack based on the updated capability information.

11. The computing device of claim 10, wherein the means for emulating the capabilities described by the received capability information comprises means for emulating a graphics device and wherein the means for redirecting the captured commands comprises means for redirecting graphics commands.

12. The computing device of claim 10, wherein the means for emulating the capabilities described by the received capability information comprises means for emulating an audio device and wherein the means for redirecting the captured commands comprises means for redirecting audio commands.

13. The computing device of claim 10, wherein the means for emulating the capabilities described by the received capability information comprises means for emulating a user input/output (I/O) device and wherein the means for redirecting the captured commands comprises means for redirecting control commands.

14. The computing device of claim 13, further comprising:
    means for receiving control commands from the remote UI; and
    means for providing the received control commands to the software application or to the software stack.

15. The computing device of claim 10, wherein the means for capturing commands generated by the software application for the software stack or generated by the software stack responsive to the execution of the software application comprises:
    a software hook installed in the software stack.

16. The computing device of claim 15, further comprising:
means for installing the software hook between selected layers of the software stack wherein the layers are selected based on the received capability information.

17. The computing device of claim 16, wherein the means for dynamically modifying the software stack based on the updated capability information comprises:
means for dynamically installing a new software hook between selected layers of the software stack wherein the layers are selected based on the updated capability information.

18. The computing device of claim 10, further comprising:
means for receiving second capability information from a second remote UI at the computing device;
means for emulating capabilities described by the received second capability information by creating a second software stack on the computing device;
means for executing a second software application on the computing device; and
means for redirecting commands generated by the second software application for the second software stack or generated by the second software stack responsive to the execution of the second software application to the second remote UI.

19. A computer program product comprising a tangible computer useable medium having computer program logic recorded thereon, said computer program logic comprising:
means for enabling a computing device to receive capability information from a remote user interface (UI) connected to the computing device via a network connection, wherein the capability information describes at least software capabilities of the remote UI;
means for enabling the computing device to emulate the capabilities described by the received capability information by creating a software stack; and
means for enabling the computing device to capture commands generated by a software application for the software stack or generated by the software stack responsive to execution of the software application and redirect the captured commands to the remote UI, the software application executing within a sandbox environment;
means for enabling the computing device to received updated capability information from the remote UI; and
means for enabling the computing device to dynamically modify the software stack based on the updated capability information.

20. The computing program product of claim 19, wherein the means for enabling the computing device to emulate capabilities described by the received capability information comprises means for enabling the computing device to emulate a graphics device and wherein the means for enabling the computing device to redirect the captured commands comprises means for enabling the computing device to redirect graphics commands.

21. The computer program product of claim 19, wherein the means for enabling the computing device to emulate capabilities described by the received capability information comprises means for enabling the computing device to emulate an audio device and wherein the means for enabling the computing device to redirect the captured commands comprises means for enabling the computing device to redirect audio commands.

22. The computer program product of claim 19, wherein the means for enabling the computing device to emulate capabilities described by the received capability information comprises means for enabling the computing device to emulate a user input/output (I/O) device and wherein the means for enabling the computing device to redirect the captured commands comprises means for enabling the computing device to redirect control commands.

23. The computer program product of claim 22, further comprising:
means for enabling the computing device to receive control commands from the remote UI; and
means for enabling the computing device to provide the received control commands to the software application or to the software stack.

24. The computer program product of claim 19, wherein the means for enabling the computing device to capture commands generated by the software application for the software stack or generated by the software stack responsive to execution of the software application comprises:
a software hook installed in the software stack.

25. The computer program product of claim 24, further comprising:
means for enabling the computing device to install the software hook between selected layers of the software stack wherein the layers are selected based on the received capability information.

26. The computer program product of claim 25, wherein the means for enabling the computing device to dynamically modify the software stack based on the updated capability information comprises:
means for enabling the computing device to dynamically install a new software hook between selected layers of the software stack based on the updated capability information.

27. The computer program product of claim 19, further comprising:
means for enabling the computing device to receive second capability information from a second remote UI;
means for enabling the computing device to emulate capabilities described by the received second capability information by creating a second software stack on the computing device; and
means for enabling the computing device to redirect commands generated by a second software application for the second software stack or generated by the second software stack responsive to execution of the second software application to the second remote UI.

28. A system comprising:
a computing device configured to execute a software application in a sandbox environment;
a remote user interface (UI) communicatively coupled to the computing device via a data communication network and configured to publish capability information thereto, wherein the capability information describes at least software capabilities of the remote UI;
wherein the computing device is further configured to emulate capabilities described by the published capability information by creating a software stack and wherein the sandbox environment is configured to redirect commands generated by the software application for the software stack or generated by the software stack responsive to execution of the software application to the remote UI; and
wherein the computing device is further configured to receive updated capability information from the remote UI and dynamically modify the software stack based on the updated capability information.

29. The system of claim 28, wherein the remote UI includes a video device, the computing device is configured to emulate the capabilities described by the received capability information by emulating the video device, and wherein the redirected commands are processed by the video device within the remote UI to generate video content.

30. The system of claim 29, wherein the remote UI further includes a display that displays the video content.

31. The system of claim 29, further comprising:
a display device communicatively coupled to the remote UI that displays the video content.

32. The system of claim 28, wherein the remote UI includes an audio device, the computing device is configured to emulate the capabilities described by the received capability information by emulating the audio device, and wherein the redirected commands are processed by the audio device within the remote UI to generate audio content.

33. The system of claim 32, wherein the remote UI further includes one or more speakers that play the audio content.

34. The system of claim 33, further comprising:
a device communicatively coupled to the remote UI that plays the audio content.

35. The system of claim 28, wherein the remote UI includes a user input/output (I/O) device, the computing device is configured to emulate the capabilities described by the received capability information by emulating the user I/O device, and wherein the redirected commands are processed by the user I/O device.

36. The system of claim 35, wherein the computing device is further configured to receive control commands from the remote UI, the control commands originating from the user I/O device, and to redirect the control commands to the software application or to the software stack.

37. The system of claim 28, wherein the remote UI is communicatively coupled to the computing device via a local area network.

38. The system of claim 28, wherein the remote UI is communicatively coupled to the computing device via a wide area network.

39. The system of claim 28, wherein the published capability information comprises one or more of graphics capability information, audio capability information, and user I/O device capability information.

40. The system of claim 28, further comprising:
a second remote UI communicatively coupled to the computing device via the data communication network and to publish second capability information thereto;
wherein the computing device is further configured to execute a second software application, to emulate capabilities described by the published second capability information by creating a second software stack, and to redirect commands generated by the second software application for the second software stack or generated by the second software stack responsive to execution of the second software application to the second remote UI.

* * * * *